W. J. SCHWEIGER.
CHAIN.
APPLICATION FILED DEC. 3, 1909.
1,058,797.
Patented Apr. 15, 1913.
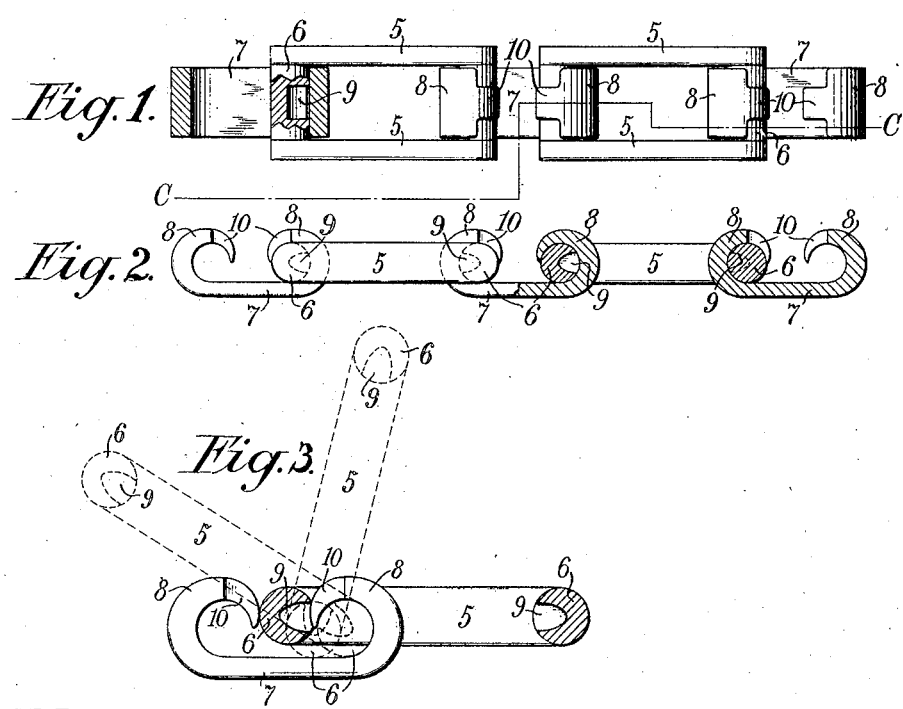
Witnesses:
Harry J. Fleischer
J. George Barry
Inventor:
William J. Schweiger
by his attorneys

UNITED STATES PATENT OFFICE.

WILLIAM J. SCHWEIGER, OF NEW YORK, N. Y.

CHAIN.

1,058,797.  Specification of Letters Patent.  Patented Apr. 15, 1913.

Application filed December 3, 1909. Serial No. 531,231.

*To all whom it may concern:*

Be it known that I, WILLIAM J. SCHWEIGER, a citizen of the United States, and resident of the borough of Bronx, in the city and State of New York, have invented new and useful Improvements in Chains, of which the following is a specification.

The object of my invention is to provide certain improvements in the construction, form and arrangement of the several links of the chain whereby the links may be readily separated from each other by a manual manipulation of the links, the structure being such that the unintentional separation of the links is impossible.

Practical embodiments of my invention are represented in the accompanying drawings, in which—

Figure 1 is a view partly in plan and partly in section of a form of my invention, Fig. 2 is a view partly in side elevation and partly in section taken in the plane of the line C—C of Fig. 1, and Fig. 3 is an enlarged detail view of the form shown in Figs. 1 and 2, showing one of the links in side elevation and another link in section, the parts being shown in full lines in the position which they assume when the links are being brought into or out of connection, other positions of one of the links being shown in dotted lines to illustrate the manipulation of the links with respect to each other for connecting or disconnecting them.

In the embodiment illustrated, a chain of mating links is illustrated. The respective links have mating ends of male and female types. In the drawings one set of alternate links 5 have their two ends of the male type and the set of alternate links 7 have their two ends of the female type. To carry out the invention it is necessary only that the mating ends of adjacent links be of opposite types, male and female. Each male end comprises a cylindrical cross-bar 6 provided with a recess 9 on its inner face, which is of a lateral extent much less than the length of said cross-bar 6 so that a large portion of the cylindrical surface of said cross-bar may serve as a bearing surface. The ends of the cross-bar outside of said recess are solid to form a complete cylindrical bearing surface. Each female end comprises a hook 8 of a width equal to the length of said cross-bar 6 and providing on its inner face a semi-cylindrical bearing surface to coöperate with said cross-bar. So far as the hook 8 proper is concerned, its inner mouth is of a size freely to permit the entrance and exit of said cross-bar 6 in connecting and disconnecting links of the chain. Means, however, to prevent accidental disconnection of the links is provided in the form of a tongue 10 of a lateral extent to enter the recess 9. This tongue 10 is centrally positioned to extend concentrically about the cross-bar 6 and to continue the mid-portion of the said semi-cylindrical bearing surface into a cylindrical bearing surface and locking surface of approximately over 240°.

To disengage the mating links they must be inturned so that link 5 assumes the position shown in dotted lines at the left of Fig. 3 relatively to link 7. The tongue 10 may then be retracted to cause it to engage in the recess 9 so that by out-turning the mating links into the relative positions such as when link 5 is in the position shown in dotted lines at the top of Fig. 3, the end of link 5 will rise out as shown in full lines in Fig. 3 to disengage its mate.

By this arrangement practically the full serviceable bearing surface of a cylindrical cross-bar chain of the non-disengageable link variety is obtained. In fact the recess 9 in practice serves as a useful pocket for lubricant.

What is claimed and what is desired to be secured by United States Letters Patent is:—

A chain of detachable links, adjacent links having interlocking mating ends; one of said ends having a cylindrical cross bar with a centrally located recess on its inner face of a length less than the length of said cross-bar; the other mating end comprising a hook of a width equal to the length of said cross-bar, having an inner semi-cylindrical bearing face for said cross-bar and a hook-opening equal to the full diameter of said cross-bar; and a locking tongue formed centrally on the terminal edge of said hook, extending concentrically about said cross-bar, on its inner face extending the central portion of said semi-cylindrical bearing face to approximately 240° of cylindrical bearing face, but being of a size to take into said recess in the cross bar to release the links upon the inturning of the two mating links followed by the retraction and outturning of the same.

In testimony, that I claim the foregoing as my invention, I have signed my name in presence of two witnesses, this thirtieth day of November 1909.

WILLIAM J. SCHWEIGER.

Witnesses:
F. GEORGE BARRY,
HENRY H. LIEME.

Copies of this patent may be obtained for five cents each, by addressing the "Commissioner of Patents, Washington, D. C."